(12) United States Patent
Elhadeedy

(10) Patent No.: US 12,074,667 B2
(45) Date of Patent: Aug. 27, 2024

(54) ANTENNA MONITORING AND SELECTION

(71) Applicant: Motional AD LLC, Boston, MA (US)

(72) Inventor: Ahmed Elhadeedy, Boston, MA (US)

(73) Assignee: Motional AD LLC

( * ) Notice: Subject to any disclaimer, the term of this patent is extended or adjusted under 35 U.S.C. 154(b) by 0 days.

(21) Appl. No.: 17/804,812

(22) Filed: May 31, 2022

(65) Prior Publication Data

US 2023/0387976 A1 Nov. 30, 2023

(51) Int. Cl.
  *H04L 5/12* (2006.01)
  *H04B 7/0456* (2017.01)
  *H04B 7/06* (2006.01)
  *H04B 7/08* (2006.01)
  *H04B 17/309* (2015.01)

(52) U.S. Cl.
  CPC ......... *H04B 7/0608* (2013.01); *H04B 7/0456* (2013.01); *H04B 7/0834* (2013.01); *H04B 17/309* (2015.01)

(58) Field of Classification Search
  CPC .. H04B 7/0608; H04B 17/309; H04B 7/0456; H04B 7/0834
  USPC ................ 375/262, 260, 259, 219, 295, 316
  See application file for complete search history.

(56) References Cited

U.S. PATENT DOCUMENTS

| | | | |
|---|---|---|---|
| 10,601,461 B1 | 3/2020 | Eaton et al. | |
| 2018/0175899 A1* | 6/2018 | Ekiz | H04B 17/19 |
| 2020/0153494 A1* | 5/2020 | Park | H04B 7/0617 |
| 2022/0263240 A1* | 8/2022 | Leather | H04B 7/0874 |

FOREIGN PATENT DOCUMENTS

WO  WO 2020/263741 A1  12/2020

OTHER PUBLICATIONS

Great Britain Office Action issued for Application No. GB 2217891.7, dated May 30, 2023.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Zewdu A Kassa
(74) *Attorney, Agent, or Firm* — Knobbe, Martens, Olson & Bear, LLP

(57) ABSTRACT

Provided are methods, systems, and computer program products for detecting degraded performance of modems and antennas. An example method may include: obtaining antenna performance data for a set of antennas of an autonomous vehicle; determining a real-time connectivity score for each antenna of the set of antennas based on the antenna performance data; obtaining location data and environment data for the autonomous vehicle; inputting the location data and the environment data to a machine learning model system; receiving a predicted connectivity score for each antenna of the set of antennas from the machine learning model system; and determining at least one antenna of the set of antennas to use for communication based on the predicted connectivity score and the real-time connectivity score for each antenna of the set of antennas.

17 Claims, 10 Drawing Sheets

ANTENNA MONITORING AND SELECTION

DETAILED DESCRIPTION

Figure 1:
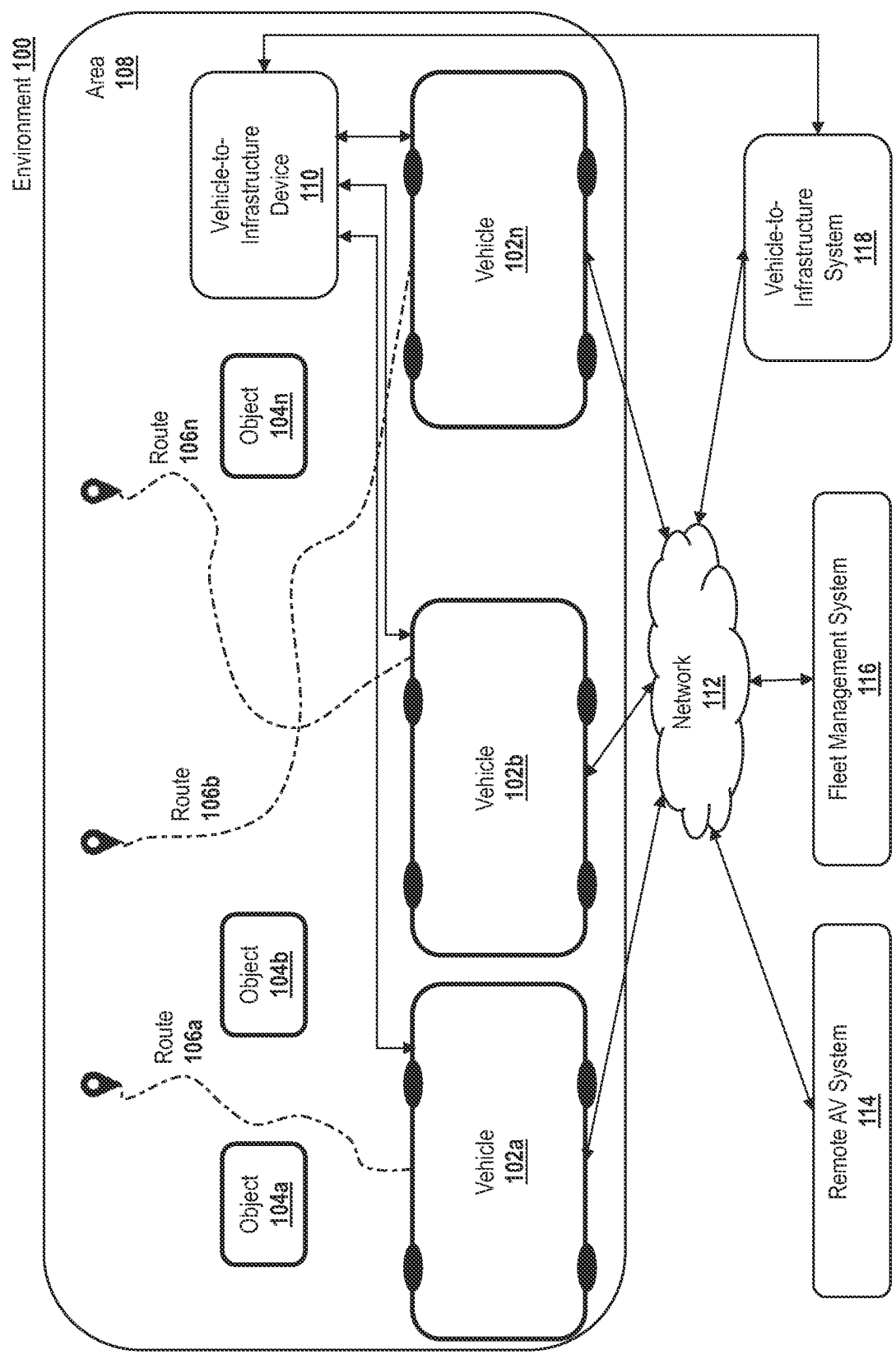
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Autonomous vehicles use antennas and modems to communicate, via cellular networks, with remote systems. For instance, the remote systems may aid navigation, provide instructions to the autonomous vehicles, or provide other services. In some cases, the autonomous vehicle may continue operation if at least one communication connection (via at least one antenna-modem pair of a set of such pairs on the autonomous vehicle) is still operational. However, sometimes antennas or modems degrade or fail. In the case of degradation, the antenna or modem may not be able to handle as much data or as fast as the antenna or modem typically could before the antenna or modem degraded. This may cause data bottlenecks, system delay, and, in some cases, safety issues because data and/or instructions being transmitted offboard/onboard the autonomous vehicle may be delayed in reaching the corresponding destination. Likewise, when antennas or modems fail, the autonomous vehicle may loss a communication channel (of several redundant channels) and any data currently being transmitted may be lost or delayed, as packet loss or packet delay.

To address these issues, an autonomous vehicle can include a detection system that monitors performance of antennas and modems. Thus, in some aspects and/or embodiments, systems, methods, and computer program products described herein include and/or implement a detection system. As a non-limiting example, the detection system may determine a set of real-time connectivity scores for a set of pairs of antennas and modems on an autonomous vehicle and compare the set of real-time connectivity scores to a set of predicted connectivity scores. A machine learning model may infer the set of predicted connectivity scores. The machine learning model may be trained to infer connectivity score based on a feature vector that includes location data and environmental data. The machine learning model may be trained on historical location data and historical environmental data to predict corresponding historical connectivity scores. In this manner, the systems and methods of the present disclosure may compare real-time scores against a predicted score that indicates how antennas and modems have performed in the past in similar locations and/or environments. In this manner, differences from the real-time score the predicted score may be detected and potential degradation of the antenna and/or modem may be flagged before a physical failure occurs.

In some cases, certain antenna and modem failure detection methods may wait until a failure happens to set a diagnostic trouble code (DTC). For instance, the certain antenna and modem failure detection methods may set a DTC when an electrical circuit short or open is detected. In this case, the detection methods may not detect degradation or pre-failure indications, thus only indicating an issue after a failure has occurred, which may increase risk of loss of communication channels.

The systems and methods of the present disclosure may use prognostics and health monitoring approaches to monitor real-time performance of the antennas and modems of autonomous vehicle over time and compare the performance to fleet data of the same under the same (or similar) environmental conditions and locations. For instance, performance of the antennas and modems may include certain cellular performance metrics, such as latency, signal strength (dBm), upload/download bandwidth, GNSS signal, time/date, cellular traffic. If the performance is different from the fleet data under the same (or similar) location and environmental conditions, the systems and methods may indicate a degraded condition and recommend further investigation. For instance, to avoid false positives, the systems and methods may use a counter and a counter threshold, so that the system determines a degradation after a threshold number of differences between a predicted connectivity score and a real-time score are counted.

In some cases, to compare the real-time performance with the fleet data, the systems and methods of the present disclosure may use statistical analysis and machine learning. For instance, the systems and methods of the present disclosure may generate real-time connectivity scores based on the real-time performance of the antennas and modems and compare the real-time connectivity scores to predicted connectivity scores. The predicted connectivity scores may be inferred by a machine learning model that has been trained on the fleet data to infer an expected behavior of a pair of antenna and modem at locations and environmental conditions.

In some cases, the systems and methods of the present disclosure may detect degradation of a pair of antenna and modem (and thus perform an action) if the real-time connectivity score for the pair is consistently lower than a predicted connectivity score by the machine learning model by more than a threshold amount or consistently outside of an acceptable range. In this case, the systems and methods may then perform one or more actions, such as: avoid use of the degraded antenna and modem, switch to antennas and modems with better performance, set a DTC and send a service request, and/or perform a minimum risk maneuver (MRM) (e.g., all antennas and modems are degraded at a same time).

In some cases, the systems and methods of the present disclosure may enable an autonomous vehicle car to run longer and predict the failure of antennas and modems before the failure occurs. Moreover, as the systems and methods of the present disclosure enable selection of non-degraded antenna, additional processing computations due to packet loss or packet delay may be avoided, thereby improving communication infrastructure in addition to improving safety and antenna and modem technologies.

By virtue of the implementation of systems, methods, and computer program products described herein, an autonomous vehicle or AV system can detect degraded antenna and modems and select non-degraded antenna and modems to perform communication. Therefore, systems of the present disclosure may increase safety and reduce computations due to packet loss or packet delay.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-toinfrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
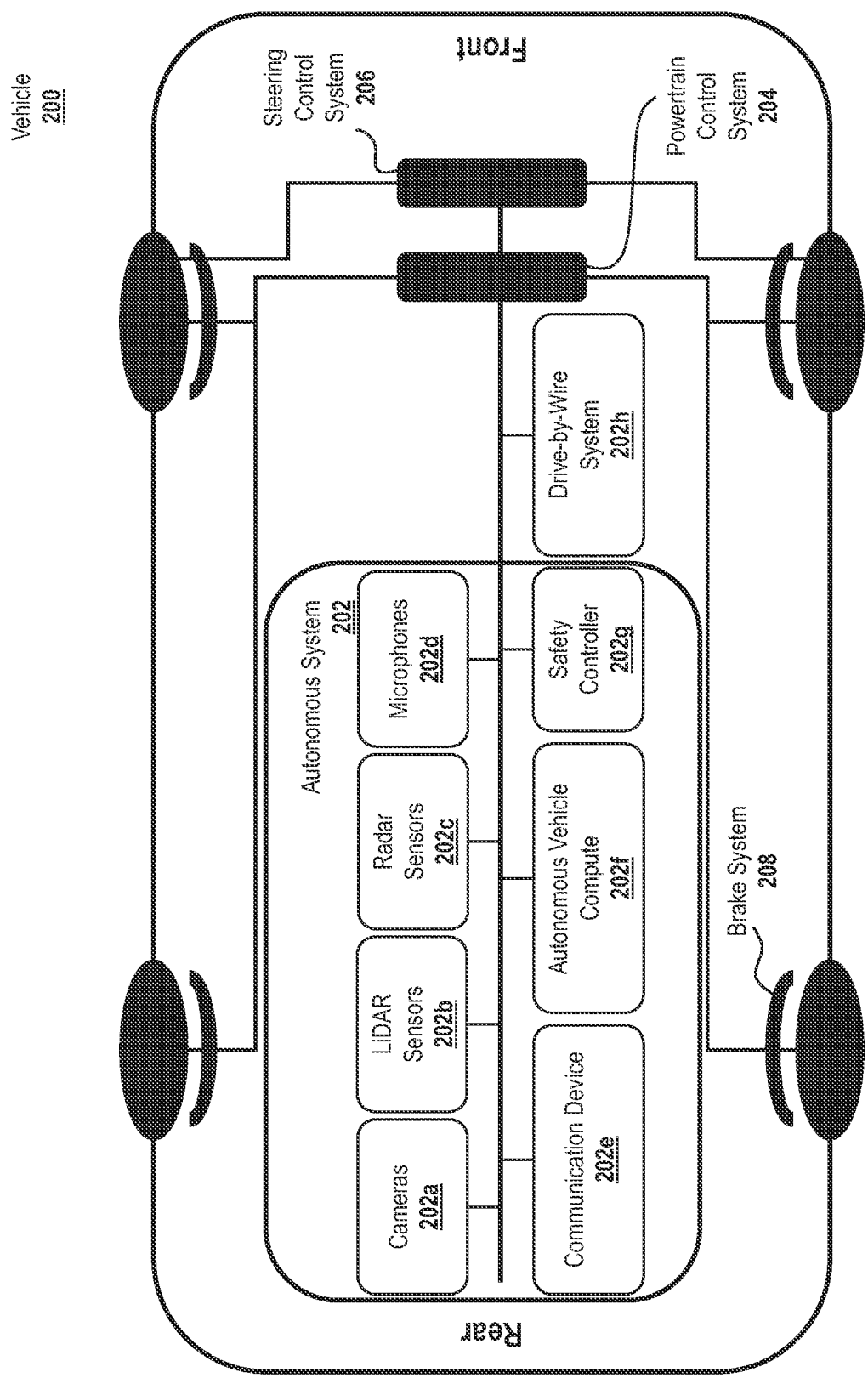
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
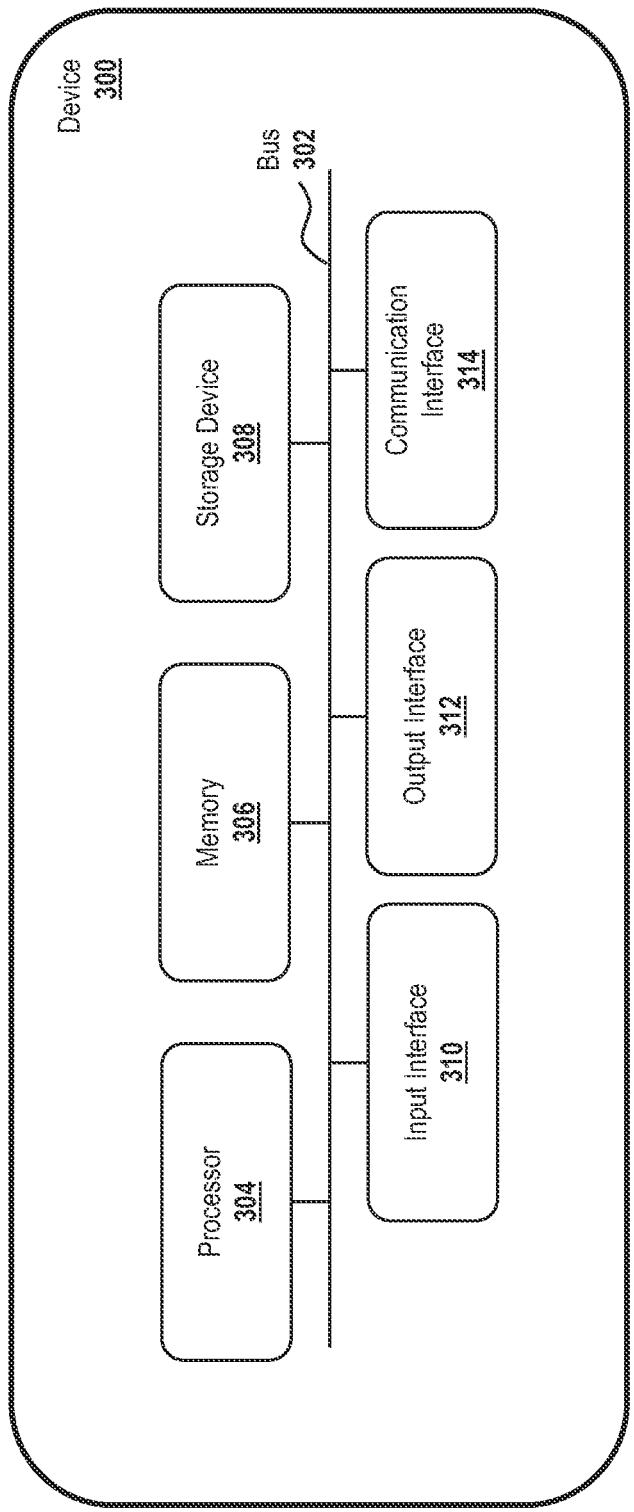
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data (TLD data) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
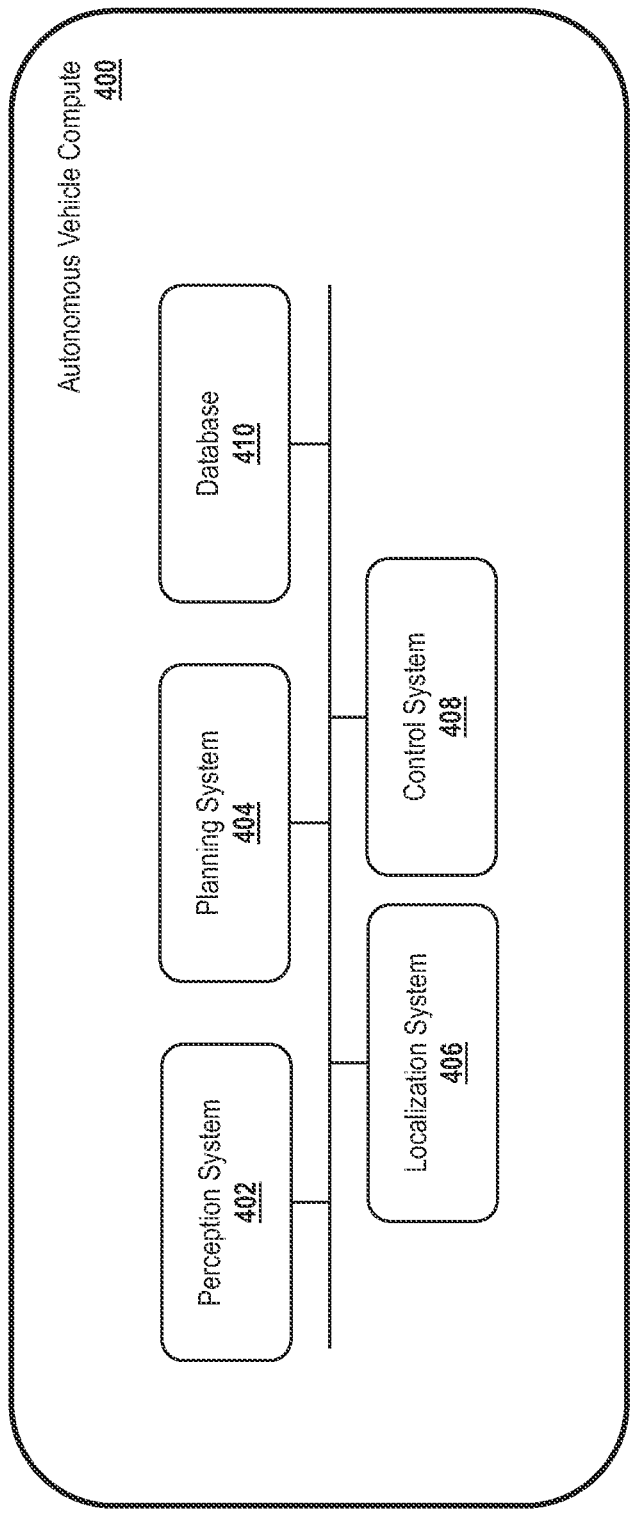
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
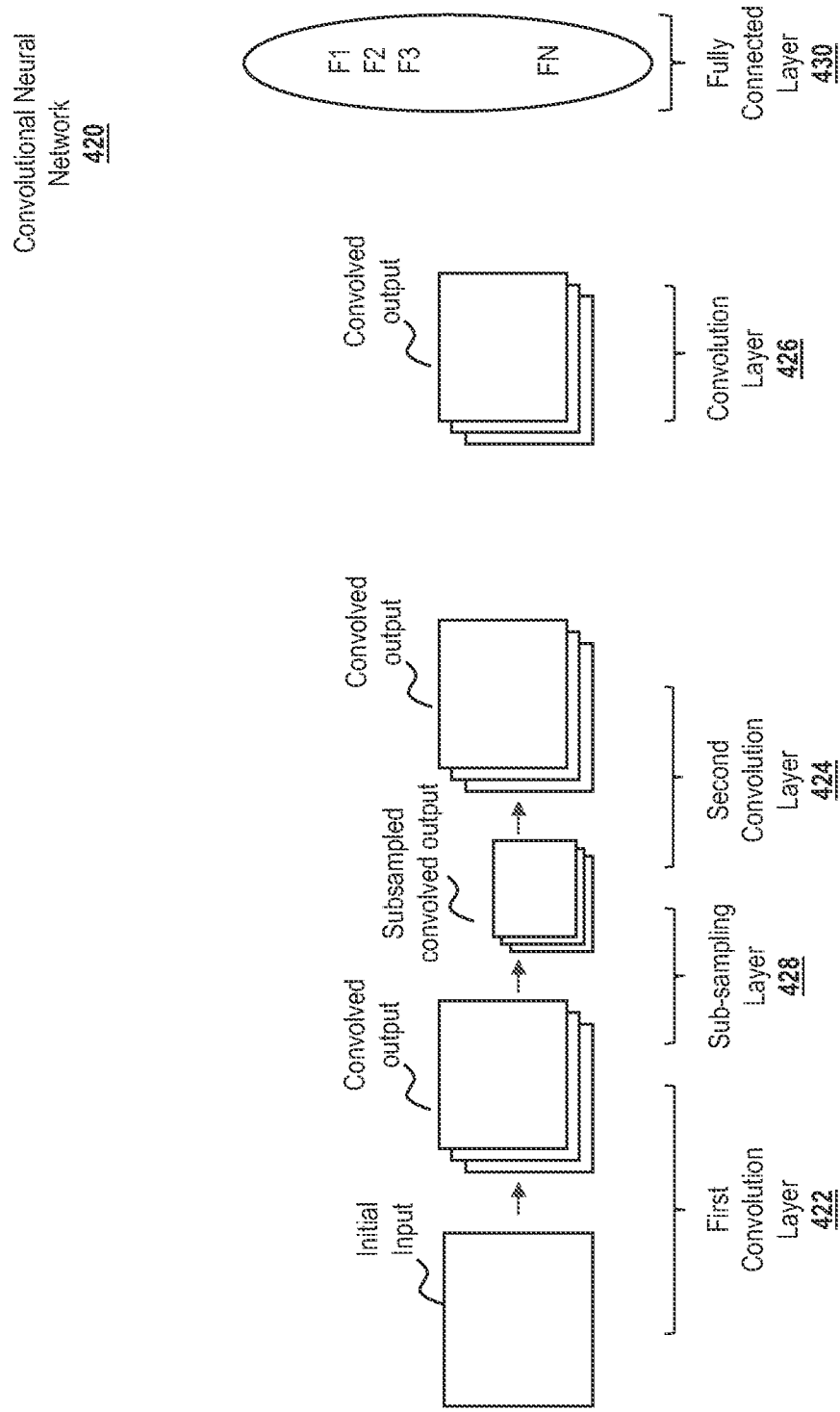
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
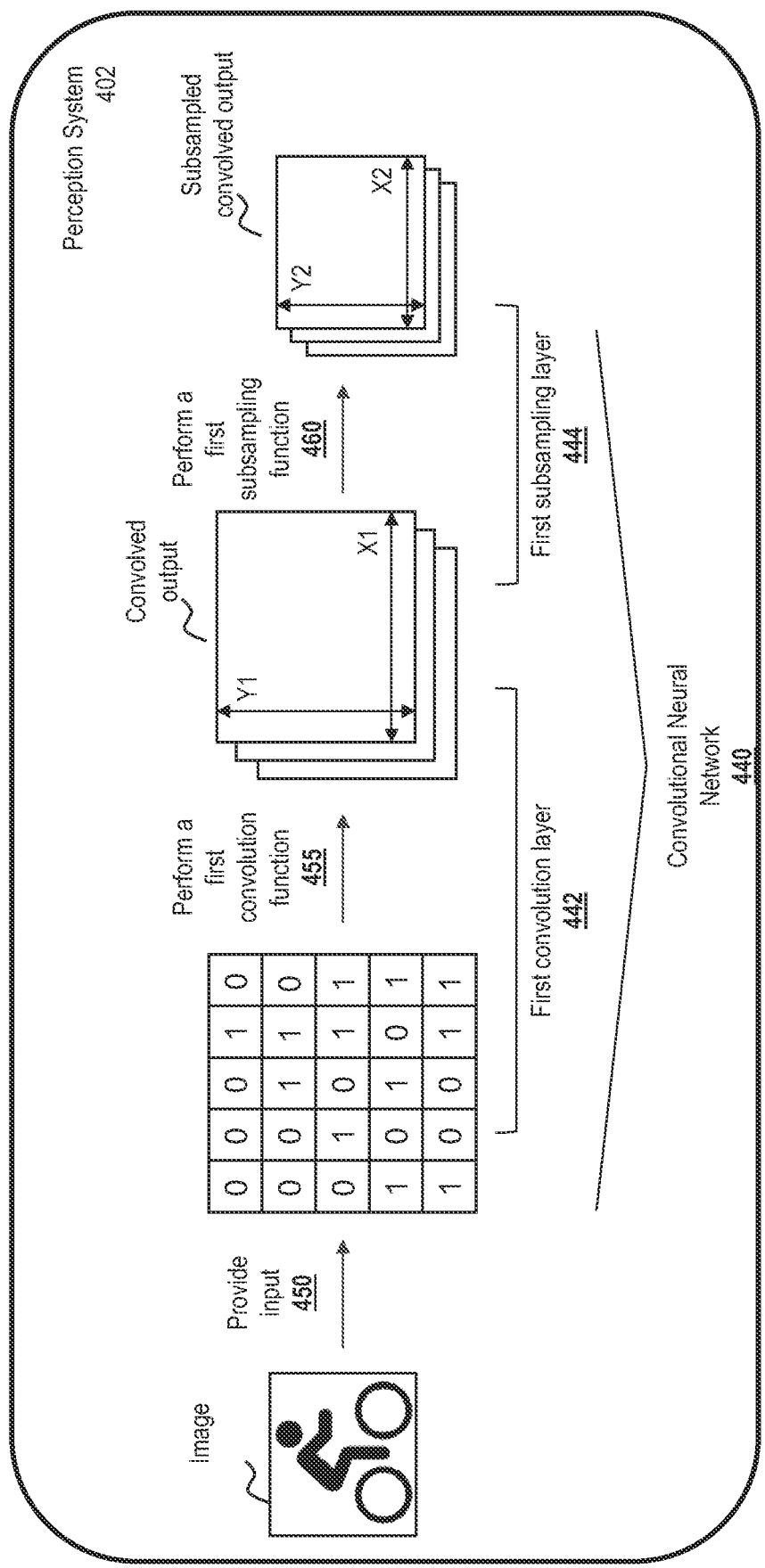
FIGS. 4C and 4D are a diagrams illustrating example operation of a CNN.
Figure 4D:
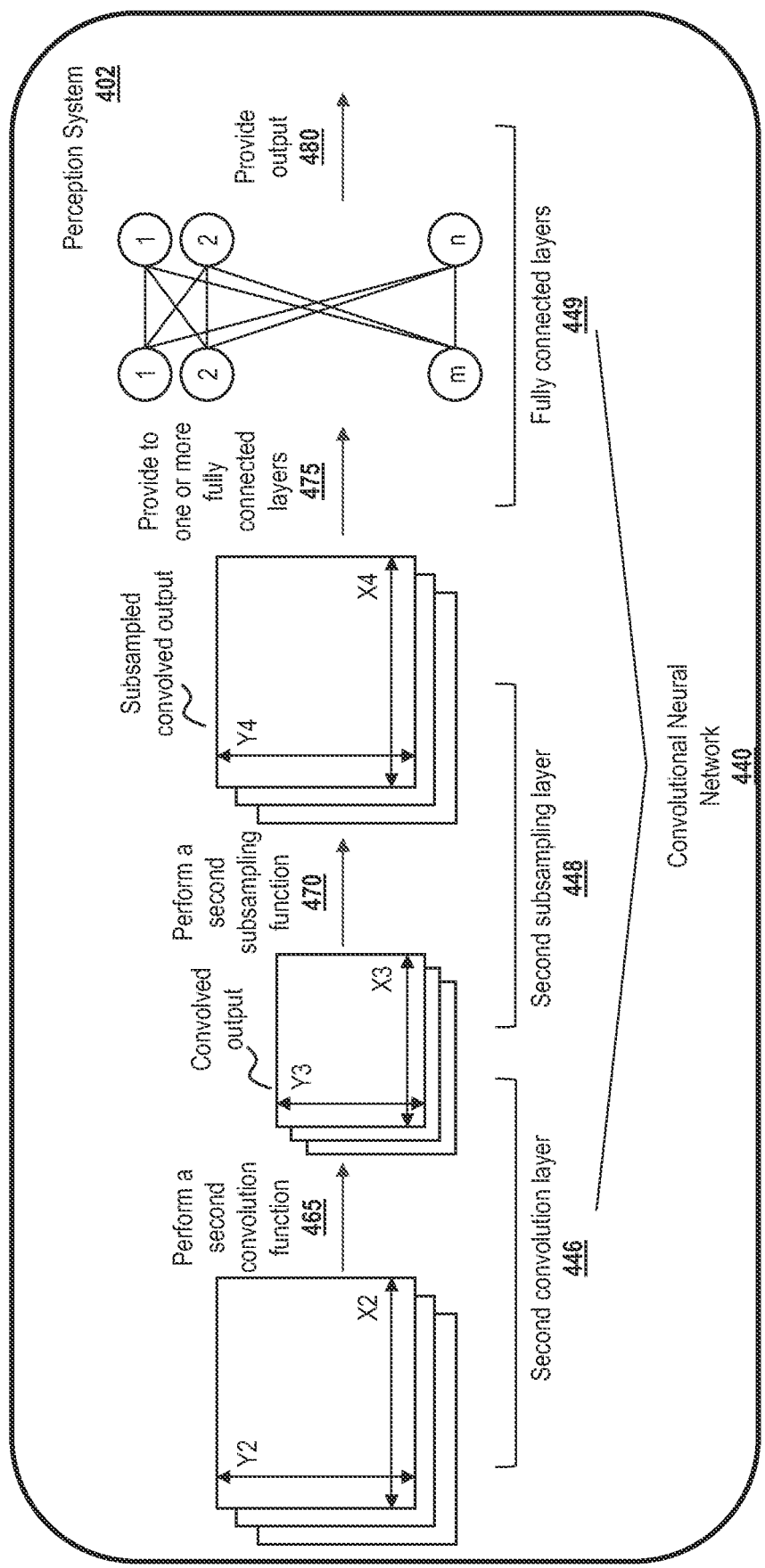

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Detection of Degraded Modem and Antenna

As described herein, autonomous vehicles use antennas and modems to communicate, via cellular networks, with remote systems. In some cases, the autonomous vehicle may continue operation if at least one communication connection (via at least one antenna-modem pair of a set of such pairs on the autonomous vehicle) is still operational. However, sometimes antennas or modems degrade or fail. This may cause data bottlenecks, system delay, and, in some cases, safety issues because data and/or instructions being transmitted offboard/onboard the autonomous vehicle may be delayed in reaching the corresponding destination. To address these issues, an autonomous vehicle can include a detection system that monitors performance of antennas and modems to detect antenna and modem degradation.

Figure 5A:
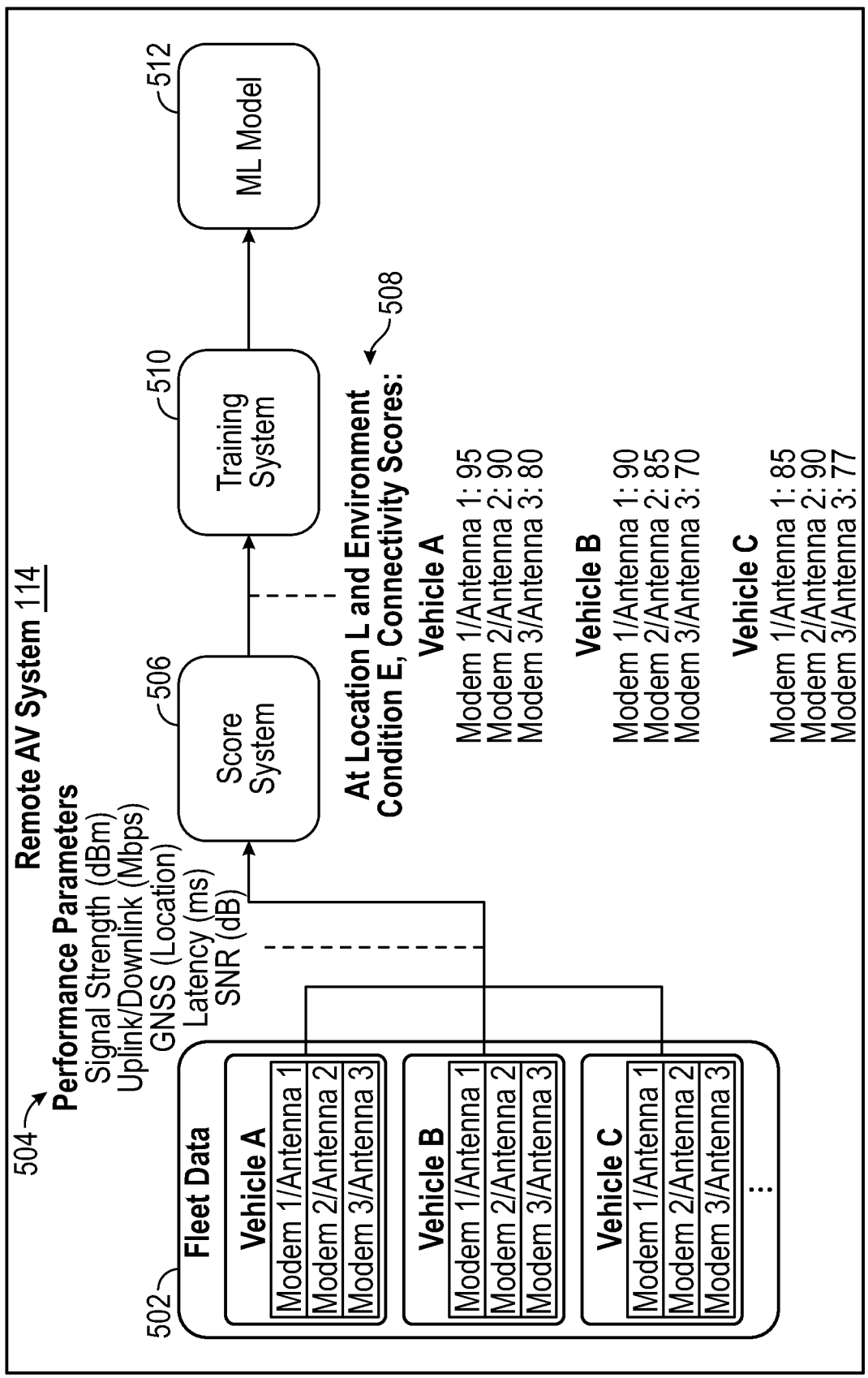
FIG. 5A is a flow diagram illustrating example communications between one or more components of an AV system for training a model to detect antenna and modem degradation.

FIG. 5A is a flow diagram illustrating example communications between one or more components of an AV system 114 for training a model to detect antenna and modem degradation. In the illustrated example, the remote AV system 114 includes a score system 506 and a training system 510.

The scoring system 506, the training system 510, and the machine learning model can be implemented using one or more processors of the AV system 114. In some cases, the machine learning model 512 can be implemented using a neural network, as described herein at least with reference to FIGS. 4B-4D, on the one or more processors of the AV system 114.

The remote AV system 114 may store and update fleet data 502 to generate (and update) a machine learning model 512. The fleet data 502 may include performance parameters 504 associated with location data and environmental data for a plurality of autonomous vehicles A through C, and the like, at a plurality of locations, environments, and times.

The remote AV system 114 may generate a training dataset 508 based on the fleet data 502. The score system 506 may generate a connectivity score for each pair of antenna and modem of an autonomous vehicle based on performance parameters 504 for the pair of antenna and modems for various locations, environments, and times. The training system 510 may receive as inputs the location data and environmental data as feature vectors and the connectivity scores as training targets, to train the machine learning model 512 to infer a connectivity score for each pair of antenna and modem based on real-time location data and real-time environmental data.

In some cases, the machine learning model 512 may infer connectivity scores for each pair of antenna and modem on an autonomous vehicle. For instance, the machine learning model 512 may output a set of connectivity scores that each respectively correspond to a pair of antenna and modem. In some cases, each pair of antenna and modem may have a machine learning model 512 that infers a connectivity score for the pair of antenna and modem. There may be tradeoffs between both cases, such as shared learning if all pairs are trained and inferred using a same machine learning model, while separate machine learning models for each pair may simplify and shorten training, tuning, and updating of the separate machine learning models.

In some cases, the remote AV system 114 may store the fleet data 502 in a data structure that stores the performance parameters 504 in association with location data and environmental data for a plurality of autonomous vehicles A through C, and the like, at a plurality of locations, environments, and times. For instance, the remote AV system 114 may store the fleet data 502 in a database (e.g., a relational database), a data lake of unstructured data, and the like. As an example, the remote AV system 114 may store the fleet data 502 in a table format, as in Table 1.

TABLE 1

Example Fleet Data:

| Vehicle | Pair | Location | Environment | Time | Parameters |
|---------|------|----------|-------------|------|------------|
| Vehicle A | Pair 1 | Location 1 | Environment 1 | Time 1 | Parameters [a1, b1, c1, ... n1] |
| Vehicle A | Pair 2 | Location 1 | Environment 1 | Time 1 | Parameters [a2, b2, c2, ... n2] |
| Vehicle A | Pair 3 | Location 1 | Environment 1 | Time 1 | Parameters [a3, b3, c3, ... n3] |
| ... | ... | ... | ... | ... | ... |
| Vehicle N | Pair 1 | Location N | Environment N | Time N | Parameters [aN, bN, cN, ... nN] |

Each set of data (vehicle, pair, location, environment, time, and parameters) may be considered a record of historical performance of a pair of antenna and modem at a particular location, environment, and time.

In some cases, the performance parameters 504 may include antenna performance data for a pair of antenna and modem. In some cases, the antenna performance data may include data indicating at least one of antenna signal strength, uplink or downlink bandwidth, a GNSS signal, latency, signal-to-noise ratio, or a cell tower identification. As an example, the modem of the pair of antenna and modem may determine the antenna performance data and report the antenna performance data in the updates to the remote AV system 114.

In some cases, the location data may include at least one of a location of the autonomous vehicle based on GNSS signals or a position on a map determined by the localization system 506. The location data may indicate where the autonomous vehicle is on the map at a specific time the performance parameters 504 are determined for the pair of antenna and modem. In this manner, the performance parameters 504 may be indexed to corresponding locations on the map at specific times.

In some cases, the environment data may include at least one of weather data obtained from a remote system and/or sensed onboard the autonomous vehicle, traffic data obtained from the remote system or sensed onboard the autonomous vehicle, or local contextual data obtained from the remote system.

The weather data may indicate external environmental features, such as temperature, precipitation (e.g., rain, snow, etc.), cloud cover, ambient light, wind (direction and strength), and the like. In this case, the remote system may be a weather service or the remote AV system 114. The onboard sensors that report weather data may include, e.g., a weather radar (such as the radar sensors 202c), rain sensors, ambient light detectors, cameras (such as the cameras 202a), thermometer, and the like.

The traffic data may indicate an amount of local vehicle and/or pedestrian traffic. In this case, the remote system may be navigation service or the remote AV system 114 that reports congestion and the like. The onboard sensors that report traffic data may include the cameras 202a, LiDAR sensors 202b, radar sensors 202c, and the like. For instance, the weather data and the traffic data may be reported via the perception system 402.

The local contextual data may include at least a connectivity user density. A connectivity user density may indicate how many user devices are connected to local cell stations, thereby indicating an amount of data congestion for cellular communication for the local cell stations. Thus, the environment data may indicate an operational context the autonomous vehicle is experiencing at a specific time the performance parameters 504 are determined for the pair of antenna and modem. In this manner, the performance parameters 504 may be indexed to corresponding locations and environment data at specific times.

In some cases, the remote AV system 114 may receive updates from one or more autonomous vehicles of the plurality of autonomous vehicles A through C. The updates may include new performance parameters 504 associated with new location data and new environmental data. In this case, "new location data" may be the same or very similar to, or different than, existing location data in the records of the fleet data 502 but is new because it is for a different time. Similarly, "new environmental data" may be the same or very similar to, or different than, existing environmental data in the records of the fleet data 502 but is new because it is for a different time. For instance, the remote AV system 114 may receive the updates in real-time, periodically (e.g., every set period of time, every set amount of distance traveled, after a trip, and the like), or after sending requests for the updates. In some cases, the remote AV system 114 may determine whether to add the updates to the fleet data 502. For instance, the remote AV system 114 may determine whether an update is similar to one or more existing records by comparing location data and/or environmental data. For instance, an update may be similar to an existing record if a location on the map is within a threshold distance to an existing location of a record. For instance, an update may be similar to an existing record if the environmental data satisfies a similarity metric (e.g., each or a defined subset of individual parameters of the environmental data are within threshold ranges of parameters of the existing record). If a record is not similar to one or more existing records, the remote AV system 114 may add the update, so as to update the machine learning model to infer accurately in a new location and/or new environment. If a record is similar to one or more existing records, the remote AV system 114 may determine whether the update is abnormal compared to the one or more existing records by determining whether parameters of the update deviate significantly from the one or more existing records (e.g., more than a standard deviation difference). In this case, the update may be held and not added as a potential outlier until a confirmation is obtained. The confirmation may be another update of a similar deviation (or a threshold number of such) or a mapping process indicates a change in environment (e.g., a change in environmental structure or cell station line of sight, and the like). If the update is not abnormal, the update may be added to the fleet data 502. If the update is confirmed, the update (and any other updates held) may be added to the fleet data 502. Thus, in this manner, the machine learning model 512 may be updated in accordance with changes in the records of the fleet data, to account for changes in environment and also in accordance with newly encountered locations and/or environments at known locations.

In some cases, to generate a connectivity score for an antenna-modem pair, the score system 506 may obtain a record from the data structure or as records are added to the fleet data 502, and generate the connectivity score based on the record. For instance, the score system 506 may obtain a first record and extract the performance parameters 504 from the first record and generate the connectivity score based on the performance parameters 504. As an example, the score system 506 may obtain weights for antenna performance data, and determine a weighted sum of the antenna performance data based on values of the antenna performance data and the weights. For instance, each of antenna signal strength, uplink or downlink bandwidth, a GNSS signal, latency, signal-to-noise ratio, and a cell tower identification may be assigned a particular weight. In some cases, certain parameters may be weighted higher than other parameters. For instance, weights for antenna signal strength, latency, and uplink or downlink bandwidth may be weighted higher than weights for, e.g., GNSS signal and cell tower identification. In some cases, the connectivity score may be a number on a scale to indicate a relative strength and utility of the pair of antenna and modem to handle communications for the autonomous vehicle.

In some cases, to generate the training dataset 508, the remote AV system 114 may associate each connectivity score (based on particular performance parameters 504) with location data and environmental data of a corresponding record. In some cases, the records of the fleet data 502 may be annotated with determined connectivity scores. In this manner, the connectivity score may be stored in association with the performance parameters 504 and not re-determined for each training or tuning update. In some cases, the remote AV system 114 may update the connectivity scores in response to changes to the score system 506 (e.g., weights adjusted). Thus, the training dataset 508 may include historical connectivity scores, historical location data, and historical environment data, as based on the fleet data 502.

In some cases, the machine learning model 512 may be a scoring model. The scoring model may be a neural network model, a convolutional neural network, and the like, such as CNN 420 or CNN 440. The training system 510 may train the scoring model to infer connectivity scores for a set of pairs of antennas and modems based on a feature vector. The feature vector may be generated (by the remote AV system 114 or the detection system 514) from the location data and the environmental data of a record (from the training dataset 508 when training) or from real-time data when deployed on an autonomous vehicle. The training system 510 may train the scoring model by predicting known connectivity scores based on corresponding location and environment data from the records. The training system 510 may adjust the scoring model based on how accurately the scoring model infers the training targets.

After the machine learning model 512 (e.g., the scoring model) has been trained by the training system 510, the remote AV system 114 may transmit the machine learning model 512 to the plurality of autonomous vehicles A through C, and the like. The plurality of autonomous vehicles A through C, and the like, may then use the machine learning model 512 in real-time to infer predicted connectivity scores for the set of pairs of antennas and modems. In this manner, the plurality of autonomous vehicles A through C, and the like, may determine whether particular pairs of antennas and modems (or antenna-modem pairs) onboard the plurality of autonomous vehicles A through C, and the like, are operating as expected, as discussed in herein.

In some cases, as updates are received or at set intervals (e.g., every period of time or set number of updates are received), the remote AV system 114 may retrain or tune the machine learning model 512. After each retraining or tuning, the remote AV system 114 may transmit a model update to the plurality of autonomous vehicles A through C, and the like, so that the plurality of autonomous vehicles A through C, and the like, may update deployed machine learning models 512. In this manner, the plurality of autonomous vehicles A through C, and the like, may provide new data to enable the machine learning model 512 to learn as new locations or environments affect connectivity of a pairs of antennas and modems.

Figure 5B:
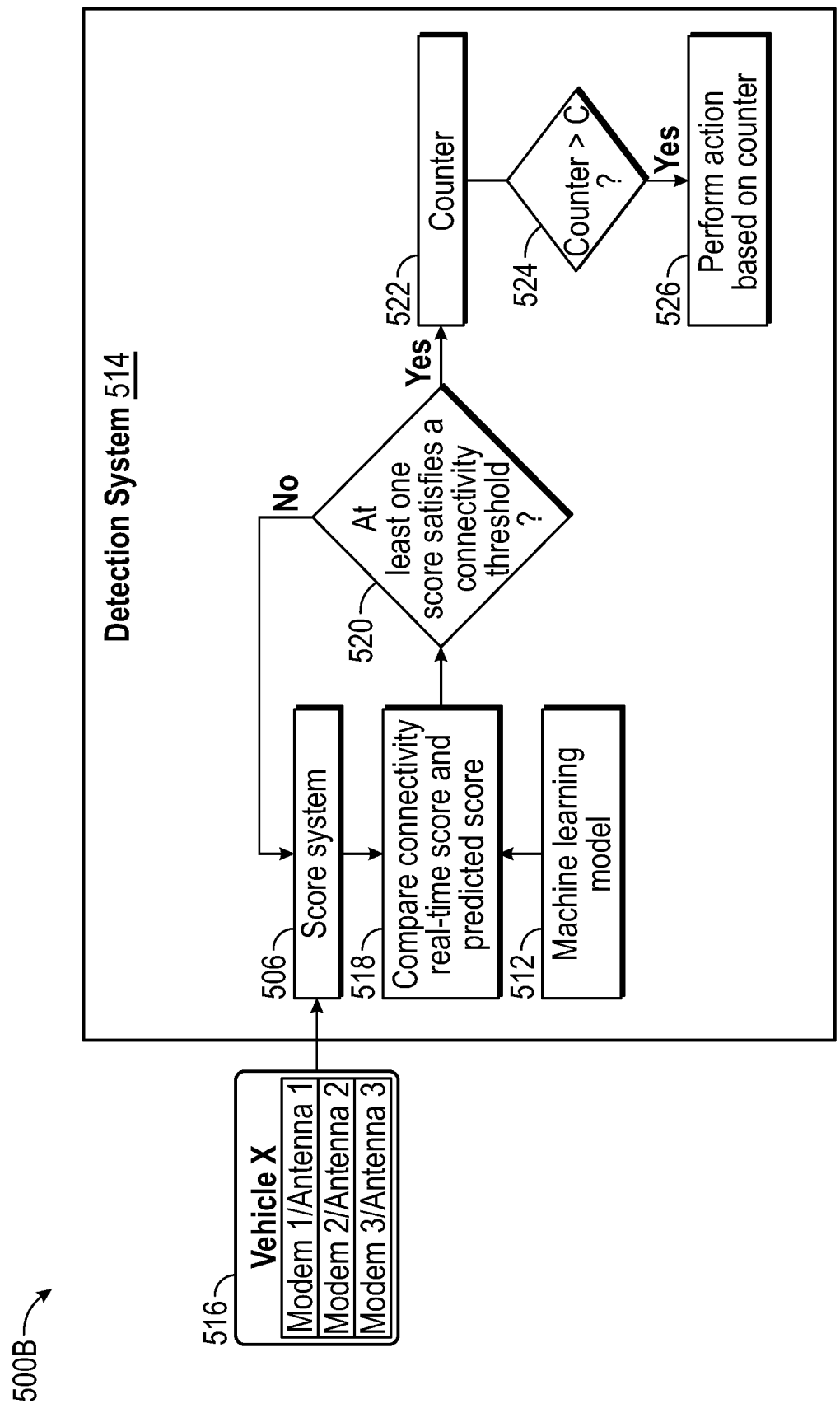
FIG. 5B is a flow diagram illustrating example communications between one or more components of an autonomous vehicle for using a machine learning model to detect antenna and modem degradation.

FIG. 5B is a flow diagram illustrating example communications between one or more components of an autonomous vehicle 200 for using a machine learning model to detect antenna and modem degradation. In the illustrated example, the autonomous vehicle 200 includes a detection system 514 that includes the score system 506 and the machine learning model 512. The score system 506 may be similar to the score system 506 discussed above. That is, the score system 506 may generate a connectivity score for each antenna-modem pair of an autonomous vehicle based on performance parameters 504.

The machine learning model 512 may host and execute functions associated with the machine learning model 512. For instance, the machine learning model 512 may receive feature vectors, process the feature vectors through the machine learning model 512, and output inferences of predicted connectivity scores.

The detection system 514 can be implemented using one or more processors and may be separate from or a part of the communication device 202e, safety controller 202g, and/or the autonomous vehicle compute 202f. For instance, the detection system 514 may (depending on the situation) inform communication path selection, instruct the autonomous vehicle to stop (e.g., an MRM), and the like.

In some cases, the detection system 514 may receive performance parameters 516 from a set of pairs of antenna and modems. Each pair of antenna and modem may be associated with a cellular communication network (e.g., Verizon®, T-Mobile®, and the like), and the set of pairs may have one or more pairs associated with a particular cellular communication network, and the like. The detection system 514 may then input the performance parameters 516 into the score system 506 to generate a set of connectivity scores for set of pairs of antenna and modems (referred to as "real-time connectivity scores"). For instance, the score system 506 may determine a weighted score for each par in the set of pairs based on corresponding performance parameters 516.

In some cases, separately (and synchronously or at time close to (e.g., within threshold time period of) when the performance parameters 516 were determined), the detection system 514 may obtain real-time location data and real-time environmental data and input the real-time data into the machine learning model 512. For instance, the detection system 514 may obtain the real-time location data and real-time environmental data and generate a feature vector and input the feature vector the machine learning model 512. The machine learning model 512 may output an inference for a predicted connectivity score for each of the set of pairs of antennas and modems (referred to as "a set of predicted connectivity scores").

At 518, the detection system 514 compares the set of real-time connectivity scores to the set of predicted connectivity scores. For instance, the detection system 514 may compare each score for each pair of antenna and modem.

At 520, the detection system 514 determines whether at least one score satisfies a connectivity threshold. For instance, the connectivity threshold may correspond to a score that indicates a degraded performance and/or an abnormal reading. If no score satisfies the connectivity threshold, the detection system 514 may return the score system 506 and start the process over again when new performance parameters 516 are received or requested, e.g., every set period of time or distance traveled. If one or more scores satisfy the connectivity threshold, at 522, the detection system 514 may proceed to iterate corresponding counters for each antenna-modem pair that has a score that satisfies the connectivity threshold.

At 522, the detection system 514 determines whether any counter satisfies a counter threshold (e.g., a preset value). If not, the detection system 514 may return to the score system 506 (not depicted) and start the process over again when new performance parameters 516 are received or requested. For example, in some cases, the detection system 514 may determine that all antenna-modem pairs are functioning if none of the counters satisfy the counter threshold. The detection system 514 may select any of antenna-modem pairs for communication (e.g., an antenna-modem pair with a highest connectivity score). In some cases, the detection system 514 may determine that all antenna-modem pairs have not stopped functioning for a threshold amount of time or distance.

If a counter does satisfy the counter threshold, at 526, the detection system 514 performs an action based on the counter. For instance, in some cases, the detection system 514 may determine that the at least one antenna-modem pair is not functioning if the counter satisfy the counter threshold. In some cases, the detection system 514 may determine that the at least one antenna-modem pair have stopped functioning for a threshold amount of time or distance. In some cases, the action may be to avoid a specific antenna-modem pair (e.g., if other pairs do not have counters that exceed the counter threshold), select a different pair of antenna and modem for communication (e.g., that does not have a counter that exceed the counter threshold), output a trouble code for the pair of antenna and modem that exceed the counter threshold, and/or perform a MRM (e.g., if all or a threshold number of pairs exceed the counter threshold). Depending on what action the detection system 514 performs, the detection system 514 may return to the score system 506 (not depicted) and start the process over again when new performance parameters 516 are received or requested.

In some cases, the detection system 514 may obtain antenna performance data for a set of antennas of an autonomous vehicle (each antenna being connected to a modem). In some such cases, the detection system 514 may then determine a real-time connectivity score for each antenna of the set of antennas based on the antenna performance data.

Separately, the detection system 514 may obtain location data and environment data for the autonomous vehicle (e.g., from perception system 402). The detection system 514 may input the location data and the environment data to the machine learning model 512 and receive a predicted connectivity score for each antenna of the set of antennas. The detection system 514 may determine at least one antenna of the set of antennas to use for communication based on the predicted connectivity score and the real-time connectivity score for each antenna of the set of antennas. For instance, the detection system 514 may select an antenna that does not satisfy the connectivity threshold for communication. In this manner, the detection system 514 may select antennas (and modems) that are operating in an as-expected condition, instead of selecting degraded antennas (and modems) to perform communication for the autonomous vehicle.

In some cases, to input the location data and the environment data to the machine learning model 512, the detection system 514 may generate a feature vector based on the location data and the environment data, and input the feature vector to the machine learning model 512. As an example, the feature vector may have defined format that is populated by values from the location data and the environment data. It will be understood that there may be various methods to generate feature vectors from known data types.

In some cases, to determine the at least one antenna of the set of antennas to use for communication, the detection system 514 may determine whether a first predicted connectivity score associated with a first antenna of the set of antennas and a first real-time connectivity score associated with the first antenna satisfy the connectivity threshold. In response to the connectivity threshold being satisfied for the first antenna, the detection system 514 may select a second antenna to use for communication that does not satisfy the connectivity threshold. In response to the connectivity threshold being not satisfied for the first antenna, the detection system 514 may select between the second antenna and the first antenna.

In some cases, the detection system 514 may determine the connectivity threshold is satisfied when the first real-time connectivity score is less than the first predicted connectivity score. In some cases, the detection system 514 may determine the connectivity threshold is satisfied when the first real-time connectivity score is less than a lower range from the first predicted connectivity score. For instance, the lower range from the connectivity score may provide a range of buffer for minor differences in connectivity without indicating a potential degradation in the antenna or modem. In some cases, the detection system 514 may determine the connectivity threshold is satisfied when the first real-time connectivity score is less than a minimum connectivity score. The minimum connectivity score may be defined by an engineer and/or statistically derived from the fleet data 502 for a lowest acceptable connectivity score to utilize for communications for the autonomous vehicle.

In some cases, the detection system 514 may, in response to the connectivity threshold being satisfied for the first antenna, iterate a count of a counter associated with the first antenna. The detection system 514 may then determine whether the count of the counter is greater than a counter threshold. If not, the detection system 514 may loop back to obtain more real-time data, and the like. In response to determining the count of the counter is greater than the counter threshold, the detection system 514 may set a diagnostic trouble code for the first antenna or determine to conduct an MRM. In this manner, the detection system 514 may increase safety by detecting degradation of antenna and modems before physical failure occurs and, in a worst case where all pairs are degraded, perform the MRM.

In some cases, the detection system 514 may, in response to the connectivity threshold being satisfied for the first antenna, transmit autonomous vehicle data to a remote system, such as the remote AV system 114. For instance, the autonomous vehicle data may include the antenna performance data or the real-time connectivity score in association with the location data and the environment data. Thus, the remote AV system 114 may receive an update when a score indicates degraded performance, even when (or in addition to) a counter does not exceed a counter threshold. In this manner, the fleet data 502 and training dataset 508 may enable the machine learning model 512 to explore (e.g., new locations and environments) and/or learn (e.g., as old locations and environments change).

Example Flow Diagram

Figure 6:
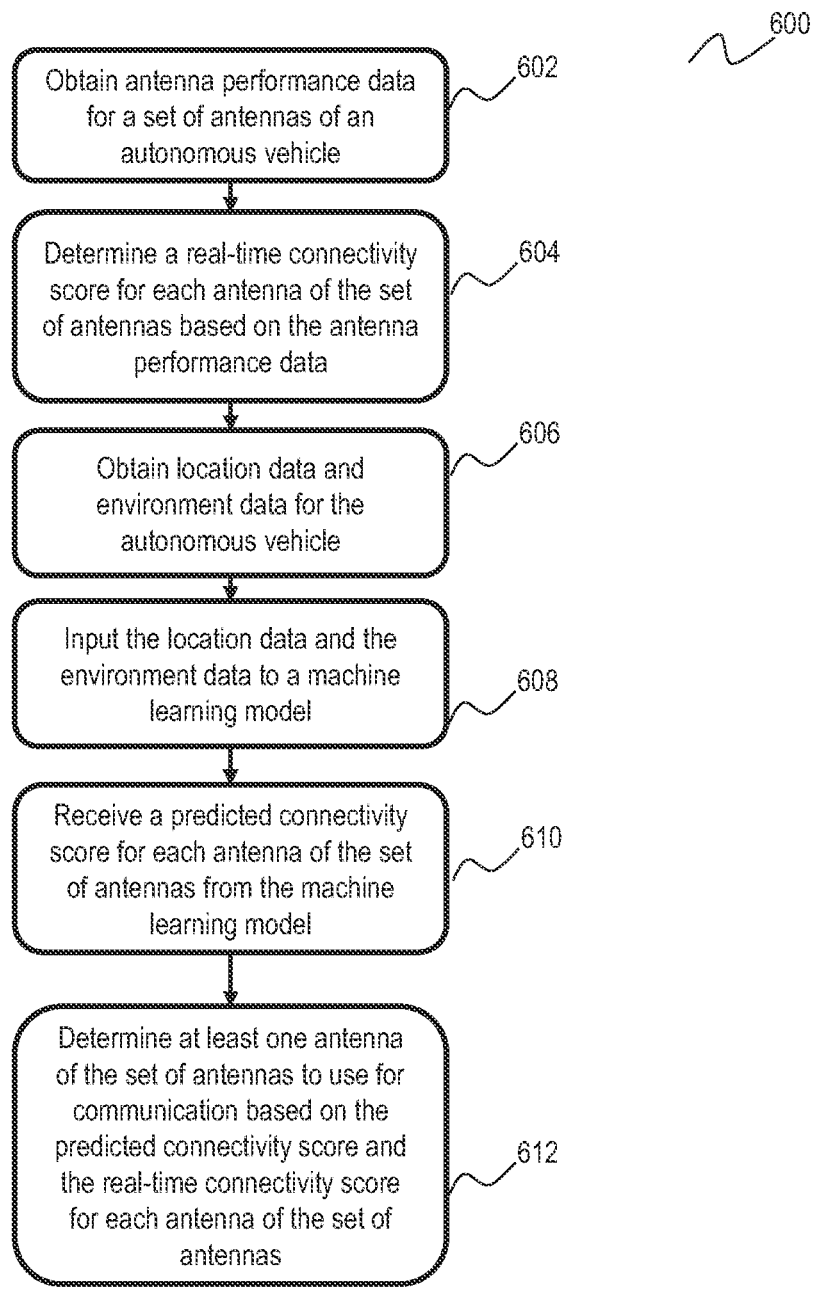
FIG. 6 is a flow diagram illustrating an example of a routine implemented by one or more processors to detect antenna and modem degradation, according to certain cases of the disclosure.

FIG. 6 is a flow diagram illustrating an example of a routine 600 implemented by one or more processors of the detection system 514 to detect antenna and modem degradation, according to certain cases of the disclosure. The flow diagram illustrated in FIG. 6 is provided for illustrative purposes only. It will be understood that one or more of the steps of the routine 600 illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 602, the detection system 514 obtains antenna performance data for a set of antennas of an autonomous vehicle. For instance, the detection system 514 may, via communication device 202e, transmit requests to and receive antenna performance data from modems of each of the set of antennas, as discussed above.

At block 604, the detection system 514 determines a real-time connectivity score for each antenna of the set of antennas based on the antenna performance data. For instance, the detection system 514 may input antenna performance data to the score system 506 and receive the real-time connectivity scores for the set of antennas, as described herein.

At block 606, the detection system 514 obtains location data and environment data for the autonomous vehicle. For instance, the detection system 514 may receive the location data from the localization system 406 and the environment data from the perception system 402 and/or the remote system, as described herein.

At block 608, the detection system 514 inputs the location data and the environment data to a machine learning model. For instance, the detection system 514 may generate a feature vector and input the feature vector to the machine learning model 512, so that the machine learning model 512 may infer a set of predicted connectivity scores, as discussed above.

At block 610, the detection system 514 receives a predicted connectivity score for each antenna of the set of antennas from the machine learning model. For instance, the detection system 514 may receive the set of predicted connectivity scores from the machine learning model 512, as discussed above.

At block 612, the detection system 514 determines at least one antenna of the set of antennas to use for communication based on the predicted connectivity score and the real-time connectivity score for each antenna of the set of antennas. For instance, the detection system 514 may select an antenna that has a score that does not satisfy the connectivity threshold, as described herein.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Examples

Various additional example embodiments of the disclosure can be described by the following clauses:

Clause 1. A method, comprising: obtaining antenna performance data for a set of antennas of an autonomous vehicle; determining a real-time connectivity score for each antenna of the set of antennas based on the antenna performance data;
  obtaining location data and environment data for the autonomous vehicle; inputting the location data and the environment data to a machine learning model system;
  receiving a predicted connectivity score for each antenna of the set of antennas from the machine learning model system; and
  determining at least one antenna of the set of antennas to use for communication based on the predicted connectivity score and the real-time connectivity score for each antenna of the set of antennas.

Clause 2. The method of Clause 1, wherein the antenna performance data comprising at least one of antenna signal strength, uplink or downlink bandwidth, GNSS signal, latency, signal-to-noise ratio, or cell tower identification.

Clause 3. The method of any of Clauses 1-2, wherein determining the real-time connectivity score for each antenna of the set of antennas based on the antenna performance data includes:
  obtaining weights for antenna performance data; and
  determining a weighted sum of the antenna performance data based on values of the antenna performance data and the weights.

Clause 4. The method of any of Clauses 1-3, wherein the location data comprises at least one of a location of the autonomous vehicle based on GNSS signals or a position on a map determined by a localization system.

Clause 5. The method of any of Clauses 1-4, wherein the environment data comprises at least one of weather data obtained from a remote system or sensed onboard the autonomous vehicle, traffic data obtained from the remote system or sensed onboard the autonomous vehicle, or local contextual data obtained from the remote system.

Clause 6. The method of Clause 5, wherein the local contextual data includes at least a connectivity user density.

Clause 7. The method of any of Clauses 1-6, wherein inputting the location data and the environment data to the machine learning model system comprises:
  generating a feature vector based on the location data and the environment data; and
  inputting the feature vector to the machine learning model system, wherein the machine learning model system comprises a scoring model trained to predict scores based on feature vectors.

Clause 8. The method of Clause 7, wherein the scoring model is trained using a training dataset, wherein the training dataset comprises historical connectivity scores, historical location data, and historical environment data based on fleet data from a plurality of autonomous vehicles, wherein training the scoring model using the training dataset comprises training the scoring model to predict the historical connectivity scores based on feature vectors generated based on the historical location data and historical environment data.

Clause 9. The method of any of Clauses 1-8, wherein determining the at least one antenna of the set of antennas to use for communication comprises:
  determining a first predicted connectivity score associated with a first antenna of the set of antennas and a first real-time connectivity score associated with the first antenna satisfy a connectivity threshold; and in response to the connectivity threshold being satisfied for the first antenna, selecting a second antenna to use for communication that does not satisfy the connectivity threshold.

Clause 10. The method of Clause 9, wherein the connectivity threshold is satisfied when the first real-time connectivity score is less than the first predicted connectivity score, when the first real-time connectivity score is less than a lower range from the first predicted connectivity score, or when the first real-time connectivity score is less than a minimum connectivity score.

Clause 11. The method of Clause 9, further comprising:
in response to the connectivity threshold being satisfied for the first antenna, iterating a count of a counter associated with the first antenna;
determining the count of the counter is greater than a counter threshold; and
in response to determining the count of the counter is greater than the counter threshold, setting a diagnostic trouble code for the first antenna or determining to conduct a minimum risk maneuver.

Clause 12. The method of Clause 9, further comprising:
in response to the connectivity threshold being satisfied for the first antenna, transmitting autonomous vehicle data to a remote system, wherein the autonomous vehicle data comprises the antenna performance data or the real-time connectivity score in association with the location data and the environment data.

Clause 13. A system, comprising:
at least one processor, and at least one non-transitory storage media storing instructions that, when executed by the at least one processor, cause the at least one processor to:
obtain antenna performance data for a set of antennas of an autonomous vehicle;
determine a real-time connectivity score for each antenna of the set of antennas based on the antenna performance data;
obtain location data and environment data for the autonomous vehicle;
input the location data and the environment data to a machine learning model system;
receive a predicted connectivity score for each antenna of the set of antennas from the machine learning model system; and
determine at least one antenna of the set of antennas to use for communication based on the predicted connectivity score and the real-time connectivity score for each antenna of the set of antennas.

Clause 14. The system of Clause 13, wherein the antenna performance data comprising at least one of antenna signal strength, uplink or downlink bandwidth, GNSS signal, latency, signal-to-noise ratio, or cell tower identification.

Clause 15. The system of any of Clauses 13-14, wherein determining the real-time connectivity score for each antenna of the set of antennas based on the antenna performance data includes:
obtaining weights for antenna performance data; and
determining a weighted sum of the antenna performance data based on values of the antenna performance data and the weights.

Clause 16. The system of any of Clauses 13-15, wherein the location data comprises at least one of a location of the autonomous vehicle based on GNSS signals or a position on a map determined by a localization system.

Clause 17. The system of any of Clauses 13-16, wherein the environment data comprises at least one of weather data obtained from a remote system or sensed onboard the autonomous vehicle, traffic data obtained from the remote system or sensed onboard the autonomous vehicle, or local contextual data obtained from the remote system.

Clause 18. The system of any of Clauses 13-17, wherein inputting the location data and the environment data to the machine learning model system comprises:
generating a feature vector based on the location data and the environment data; and
inputting the feature vector to the machine learning model system, wherein the machine learning model system comprises a scoring model trained to predict scores based on feature vectors.

Clause 19. The system of claim 18, wherein the scoring model is trained using a training dataset, wherein the training dataset comprises historical connectivity scores, historical location data, and historical environment data based on fleet data from a plurality of autonomous vehicles, wherein training the scoring model using the training dataset comprises training the scoring model to predict the historical connectivity scores based on feature vectors generated based on the historical location data and historical environment data.

Clause 20. At least one non-transitory storage media storing instructions that, when executed by at least one processor, cause the at least one processor to:
obtain antenna performance data for a set of antennas of an autonomous vehicle;
determine a real-time connectivity score for each antenna of the set of antennas based on the antenna performance data;
obtain location data and environment data for the autonomous vehicle;
input the location data and the environment data to a machine learning model system;
receive a predicted connectivity score for each antenna of the set of antennas from the machine learning model system; and
determine at least one antenna of the set of antennas to use for communication based on the predicted connectivity score and the real-time connectivity score for each antenna of the set of antennas.

What is claimed is:
1. A method, comprising:
obtaining antenna performance data for a set of antennas of an autonomous vehicle;
determining a real-time connectivity score for each antenna of the set of antennas based on the antenna performance data, wherein determining the real-time connectivity score for each antenna of the set of antennas based on the antenna performance data comprises:
obtaining weights for at least a portion of the antenna performance data corresponding to the respective antenna,
determining a weighted sum of the at least a portion of the antenna performance data corresponding to the respective antenna based on values of the at least a portion of the antenna performance data and the weights, and
determining the real-time connectivity score for the respective antenna based on the weighted sum of the at least a portion of the antenna performance data;
obtaining location data and environment data for the autonomous vehicle;
inputting the location data and the environment data into a machine learning model system;

receiving a predicted connectivity score for each antenna of the set of antennas from the machine learning model system; and determining at least one antenna of the set of antennas to use for communication based on the predicted connectivity score and the real-time connectivity score for each antenna of the set of antennas.

2. The method of claim 1, wherein the antenna performance data comprising at least one of antenna signal strength, uplink or downlink bandwidth, GNSS signal, latency, signal-to-noise ratio, or cell tower identification.

3. The method of claim 1, wherein the location data comprises at least one of a location of the autonomous vehicle based on GNSS signals or a position on a map determined by a localization system.

4. The method of claim 1, wherein the environment data comprises at least one of weather data obtained from a remote system or sensed onboard the autonomous vehicle, traffic data obtained from the remote system or sensed onboard the autonomous vehicle, or local contextual data obtained from the remote system.

5. The method of claim 4, wherein the local contextual data includes at least a connectivity user density.

6. The method of claim 1, wherein inputting the location data and the environment data to the machine learning model system comprises:

generating a feature vector based on the location data and the environment data; and inputting the feature vector to the machine learning model system, wherein the machine learning model system comprises a scoring model trained to predict scores based on feature vectors.

7. The method of claim 6, wherein the scoring model is trained using a training dataset, wherein the training dataset comprises historical connectivity scores, historical location data, and historical environment data based on fleet data from a plurality of autonomous vehicles, wherein training the scoring model using the training dataset comprises training the scoring model to predict the historical connectivity scores based on feature vectors generated based on the historical location data and historical environment data.

8. A method, comprising:

obtaining antenna performance data for a set of antennas of an autonomous vehicle;

determining a real-time connectivity score for each antenna of the set of antennas based on the antenna performance data;

obtaining location data and environment data for the autonomous vehicle;

inputting the location data and the environment data into a machine learning model system;

receiving a predicted connectivity score for each antenna of the set of antennas from the machine learning model system; and determining at least one antenna of the set of antennas to use for communication based on the predicted connectivity score and the real-time connectivity score for each antenna of the set of antennas, wherein determining the at least one antenna of the set of antennas to use for communication comprises:

determining a first predicted connectivity score associated with a first antenna of the set of antennas and a first real-time connectivity score associated with the first antenna satisfy a connectivity threshold; and in response to the connectivity threshold being satisfied for the first antenna, selecting a second antenna to use for communication that does not satisfy the connectivity threshold.

9. The method of claim 8, wherein the connectivity threshold is satisfied when the first real-time connectivity score is less than the first predicted connectivity score, when the first real-time connectivity score is less than a lower range from the first predicted connectivity score, or when the first real-time connectivity score is less than a minimum connectivity score.

10. The method of claim 8, further comprising:

in response to the connectivity threshold being satisfied for the first antenna, iterating a count of a counter associated with the first antenna;

determining the count of the counter is greater than a counter threshold; and in response to determining the count of the counter is greater than the counter threshold, setting a diagnostic trouble code for the first antenna or determining to conduct a minimum risk maneuver.

11. The method of claim 8, further comprising:

in response to the connectivity threshold being satisfied for the first antenna, transmitting autonomous vehicle data to a remote system, wherein the autonomous vehicle data comprises the antenna performance data or the real-time connectivity score in association with the location data and the environment data.

12. A system, comprising:

at least one processor, and at least one non-transitory storage media storing computer-executable instructions that, when executed by the at least one processor, cause the at least one processor to:

obtain antenna performance data for a set of antennas of an autonomous vehicle;

determine a real-time connectivity score for each antenna of the set of antennas based on the antenna performance data, wherein to determine the real-time connectivity score for each antenna of the set of antennas based on the antenna performance data, the computer-executable instructions further cause the at least one processor to:

obtain weights for at least a portion of the antenna performance data corresponding to the respective antenna, determine a weighted sum of the at least a portion of the antenna performance data corresponding to the respective antenna based on values of the at least a portion of the antenna performance data and the weights, and determine the real-time connectivity score for the respective antenna based on the weighted sum of the at least a portion of the antenna performance data;

obtain location data and environment data for the autonomous vehicle;

input the location data and the environment data to a machine learning model system;

receive a predicted connectivity score for each antenna of the set of antennas from the machine learning model system; and determine at least one antenna of the set of antennas to use for communication based on the predicted connectivity score and the real-time connectivity score for each antenna of the set of antennas.

13. The system of claim 12, wherein the antenna performance data comprising at least one of antenna signal strength, uplink or downlink bandwidth, GNSS signal, latency, signal-to-noise ratio, or cell tower identification.

14. The system of claim 12, wherein the location data comprises at least one of a location of the autonomous vehicle based on GNSS signals or a position on a map determined by a localization system.

15. The system of claim 12, wherein the environment data comprises at least one of weather data obtained from a remote system or sensed onboard the autonomous vehicle, traffic data obtained from the remote system or sensed onboard the autonomous vehicle, or local contextual data obtained from the remote system.

16. The system of claim 12, wherein to input the location data and the environment data to the machine learning model system, the computer-executable instructions further cause the at least one processor to:

generate a feature vector based on the location data and the environment data; and input the feature vector to the machine learning model system, wherein the machine learning model system comprises a scoring model trained to predict scores based on feature vectors.

17. The system of claim 16, wherein the scoring model is trained using a training dataset, wherein the training dataset comprises historical connectivity scores, historical location data, and historical environment data based on fleet data from a plurality of autonomous vehicles, wherein training the scoring model using the training dataset comprises training the scoring model to predict the historical connectivity scores based on feature vectors generated based on the historical location data and historical environment data.

* * * * *